(12) United States Patent
Pienkos

(10) Patent No.: US 8,734,875 B1
(45) Date of Patent: *May 27, 2014

(54) STUFFED DOUGH POCKET WITH GRASPING EXTENSION

(75) Inventor: John T. Pienkos, Glendale, WI (US)

(73) Assignee: Innovaport LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/068,076

(22) Filed: May 2, 2011

Related U.S. Application Data

(63) Continuation of application No. 10/783,540, filed on Feb. 20, 2004, now Pat. No. 7,943,188.

(51) Int. Cl.
*A23L 1/16* (2006.01)

(52) U.S. Cl.
USPC ............... 426/90; 426/92; 426/94; 426/104; 426/134; 426/549; D1/126

(58) Field of Classification Search
USPC ............ 426/91, 94, 104, 134, 138, 275; D1/126, 101–105
See application file for complete search history.

(56) References Cited

U.S. PATENT DOCUMENTS

| | | | | |
|---|---|---|---|---|
| D151,871 S | * | 11/1948 | Carapellotti | D1/126 |
| 3,026,822 A | * | 3/1962 | Gatti | 99/450.6 |
| D193,542 S | * | 9/1962 | Gordon | D1/123 |
| D195,498 S | * | 6/1963 | Gordon | D1/123 |
| 3,331,626 A | * | 7/1967 | Kaufman | 294/99.2 |
| 3,804,956 A | * | 4/1974 | Bongiovanni | 426/556 |
| 4,139,644 A | * | 2/1979 | Stephenson | 426/134 |
| D271,914 S | * | 12/1983 | Uno | D1/101 |
| 4,484,390 A | * | 11/1984 | Wojtowicz | 30/316 |
| 4,491,601 A | * | 1/1985 | Bernal | 426/421 |
| 4,938,515 A | * | 7/1990 | Fazio | 294/25 |
| 4,938,975 A | * | 7/1990 | Waller | 426/91 |
| 5,489,444 A | * | 2/1996 | Farris | 426/421 |
| D417,331 S | * | 12/1999 | Vacca | D1/111 |
| 6,030,651 A | * | 2/2000 | Bronner | 426/91 |
| 6,177,110 B1 | * | 1/2001 | Chan | 426/90 |
| 6,242,021 B1 | * | 6/2001 | Rooney et al. | 426/89 |
| D489,511 S | * | 5/2004 | Creo | D1/113 |
| D492,465 S | * | 7/2004 | Creo | D1/113 |
| 2004/0018276 A1 | * | 1/2004 | Hsieh | 426/94 |
| 2005/0109221 A1 | * | 5/2005 | Chang | 99/450.6 |
| 2006/0263491 A1 | * | 11/2006 | Jones | 426/104 |

OTHER PUBLICATIONS

Crispy Baked Ravioli, 2003, http://www.food.com/recipeprint.do?rid=57075.*

* cited by examiner

*Primary Examiner* — Drew E Becker

(57) ABSTRACT

A food product includes a pocket formed from dough, a portion of a food stuffing material captured within the pocket, and a protrusion coupled to the pocket. The protrusion is capable of being grasped and, when so grasped, the pocket is capable of being supported by the protrusion. A method of manufacturing such a food product is also disclosed. The food product relates to pocket-foods such as pierogies, ravioli, and similar foods.

20 Claims, 5 Drawing Sheets

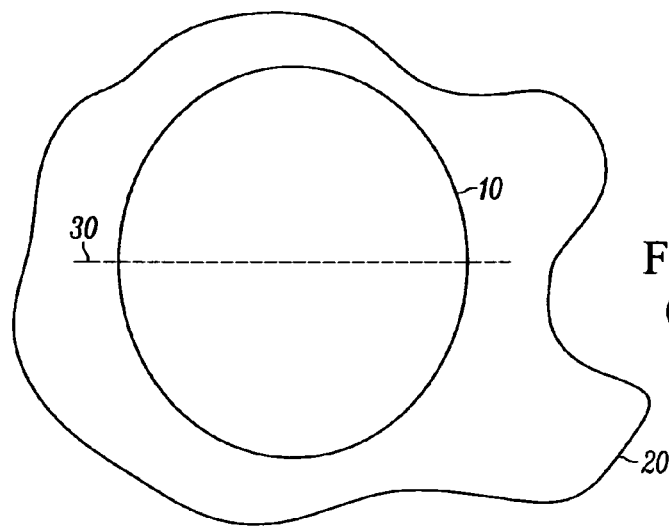
FIG. 1(A)
(PRIOR ART)
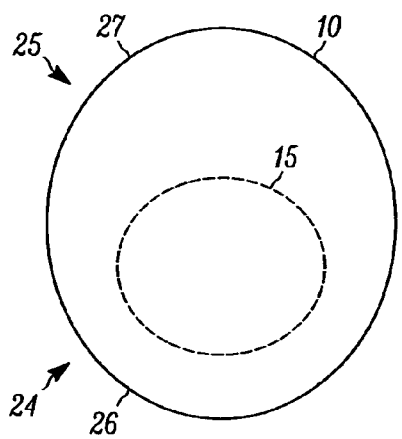
FIG. 1(B)
(PRIOR ART)
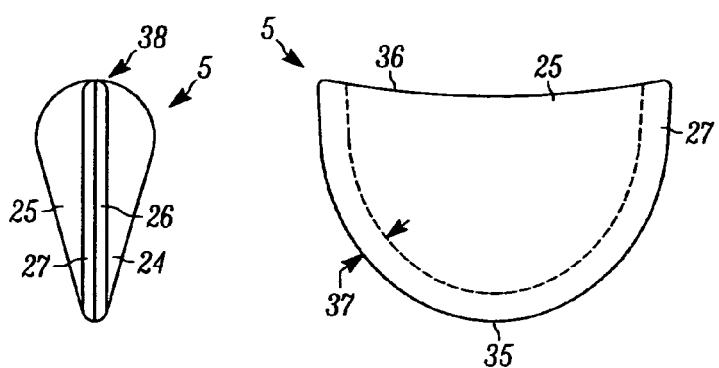
FIG. 1(C)
(PRIOR ART)
FIG. 1(D)
(PRIOR ART)

STUFFED DOUGH POCKET WITH GRASPING EXTENSION

CROSS-REFERENCE TO RELATED APPLICATION

This application is a continuation of U.S. patent application Ser. No. 10/783,540, now U.S. Pat. No. 7,943,188, entitled "STUFFED DOUGH POCKET WITH GRASPING EXTENSION" filed on Feb. 20, 2004, claims the benefit of that application, and hereby incorporates by reference herein that application.

FIELD OF THE INVENTION

The present invention relates to the manufacture/processing of foods. In particular, the present invention relates to the preparation of foods that can be easily and inexpensively readied for consumption and that, when readied for consumption, are easy to eat by consumers in the absence of utensils, e.g., fast food in a finger-food form.

BACKGROUND OF THE INVENTION

A number of popular types of food generally take the form of pockets formed from dough that are stuffed with a variety of other food stuffings. Among these are pierogi, ravioli, pot-stickers, knedle, piroshki, calzones, empanadas and various other dumplings and similar types of food. The food stuffings employed in these pockets can vary widely, from cheese or meat stuffings to potato-onion, sauerkraut, mushroom, spinach, and other vegetable or fruit stuffings.

Typically, the pockets are formed by preparing a relatively thin sheet of dough, cutting out a limited section of the dough, placing some food stuffing near the center of the section of dough, wrapping the dough about the food stuffing, and attaching edges of the dough being wrapped around the food stuffing to one another in such a manner that the food stuffing is contained within the pocket. In some cases, the pockets are formed by securing multiple sections of dough to one another around the food stuffing. In further cases, it can be appropriate to start with a preformed pocket or even simply a blob of dough, and then to insert or inject food stuffing into that pocket or into a cavity that exists (or develops, due to the injection process) within the dough.

Once the pockets are formed, they can then further be refrigerated, frozen or otherwise stored for later use, or finally prepared for eating. Final preparation for eating typically involves cooking the dough with the stuffing inside the dough pocket. Typically, the pockets are finally prepared for eating in one of two ways, namely, by frying or boiling/steaming (or even microwaving), although it is conceivable that other cooking processes could be used such as grilling or baking. Once finally prepared, the pockets can be combined with other foods. Frequently, butter or sauces are applied onto the pockets, or the pockets can be eaten in conjunction with other condiments such as sour cream.

Despite their popularity, these foods are generally not considered or eaten as finger-food. Regardless of whether the pockets are fried or boiled/steamed (or otherwise finally prepared), the pockets can be uncomfortably hot to pick up with one's fingers when the pockets are served, since in some cases the interior stuffing tends to retain heat fairly well after the pockets have left the frying or boiling/steaming (or other preparation) process. Additionally, it is generally inconvenient to handle the pockets due to their bulbous shape and often slippery exterior (e.g., due to grease following frying, other moisture exuded by the pockets following the boiling/steaming process, or the butter, sauces or condiments applied to the pockets). In particular, when fried, the pockets are typically greasy on their outside. Consequently, if one attempts to pick up the pockets with one's fingers, one's hand may become undesirably oily. When boiled/steamed, the pockets will typically be less greasy but can be more fragile than when fried.

Because of these difficulties, pocket-foods tend to be eaten through the use of utensils. This in turn limits the pocket-foods to being eaten in environments in which utensils and conventional plates are available. Further, because significant cutting pressure is often required to cut pocket-foods with conventional forks and knives, the serving of pocket-foods using paper/plastic plates and plastic utensils is not ideal. Consequently, despite their popularity and good taste, pocket-foods largely remain the province of home-cooked meals and moderately-priced to upscale sit-down restaurants. Pocket-foods are generally not served in true fast-food restaurants, despite the fact that other foods having somewhat similar structures, particularly foods in which pre-cooked dough blankets akin to pancakes are wrapped around various food stuffings (e.g., burritos), are quite popular as fast foods.

Given the popularity of fast-foods generally and finger-foods that can be eaten without utensils in particular, and given that it is always desirable for consumers to have additional culinary/dietary options available to them, it would be advantageous if a new form of pocket-food could be created that avoided the above-described difficulties. In particular, it would be advantageous if such a new form of pocket-food was created that could be easily picked-up by a consumer using his or her fingers, where the heat transferred to the consumer's fingers from the food stuffings within the pockets was limited such that it was not uncomfortable to pick up the pockets. Further, it would be advantageous if the new form of pocket-food was designed in such a way that only a minimal amount of grease, moisture, or other residue would be transferred to the consumer's fingers when handling the pocket-food. It would additionally be advantageous if the new pocket-food, when prepared by way of boiling/steaming, had greater structural rigidity than conventional pocket-foods prepared by way of boiling/steaming.

SUMMARY OF THE INVENTION

The present inventor has recognized that it would be possible to modify the conventional structure of pocket-foods to make it easier for such foods to be eaten as finger-foods (without the use of utensils) by adding to those pocket-foods one or more flanges/ears or other protrusions that formed readily-identifiable and easily-grasped extensions of the pockets. Assuming that those protrusions were appropriately positioned and secured to the remainder of the pockets, it would be possible for a consumer to easily pick up the pocket-foods by way of the one or more of the protrusions (e.g., by grasping a protrusion between the consumer's thumb and index finger). Further, if the protrusions only consisted of dough or some other material that was not itself stuffed with the food stuffing, the protrusions would not be heated to the same degree as the stuffed portion(s) of the pockets, thus rendering the picking-up of the pockets more comfortable. Additionally, any grease or other moisture content along the protrusions would be limited in amount. Further, in certain embodiments, the protrusion(s) of a pocket-food could be secured to the rest of the pocket of the pocket-food in a manner tending to strengthen the overall structure of the pocket-food.

In particular, the present invention relates to a food product comprising a pocket formed from dough, a portion of a food stuffing material captured within the pocket; and a protrusion coupled to the pocket. The protrusion is capable of being grasped and, when so grasped, the pocket is capable of being supported by the protrusion.

The present invention further relates to an apparatus for use in combination with a food item including a pocket formed from dough and a portion of a food stuffing material captured within the pocket. The apparatus includes means for grasping the food item, where the means for grasping is one of removably couplable to the pocket and fixedly coupled to the pocket, and where when the means for grasping the food item is coupled to the food item, the food item can be supported by using the means for grasping.

The present invention additionally relates to a method of manufacturing a pocket-food item at least in part from a dough so that the pocket-type item is graspable. The method includes providing a sheet of dough, cutting out a plurality of sections of the dough, applying a portion of secondary food material adjacent to at least one of the sections of the dough, and securing the portion of secondary food material within the at least one section of the dough so that the secondary food material is captured within the at least one section of the dough. The at least one section of the dough and the secondary food material therein forms at least a portion of the pocket-type item, and at least one of the at least one section of the dough and a secondary portion coupled to the at least one section of the dough includes a protrusion. Further, the protrusion is capable of being grasped and, when so grasped, the pocket is capable of being supported by the protrusion.

BRIEF DESCRIPTION OF THE DRAWINGS

FIGS. 1(A)-1(C) are, respectively, front elevation views of three steps in the forming of an exemplary pocket-food (a pierogi) in accordance with the Prior Art;

FIG. 1(D) is a side elevation view of the exemplary pocket-food shown in FIG. 1(C), also in accordance with the Prior Art;

DETAILED DESCRIPTION OF THE DRAWINGS

Figure 2A:
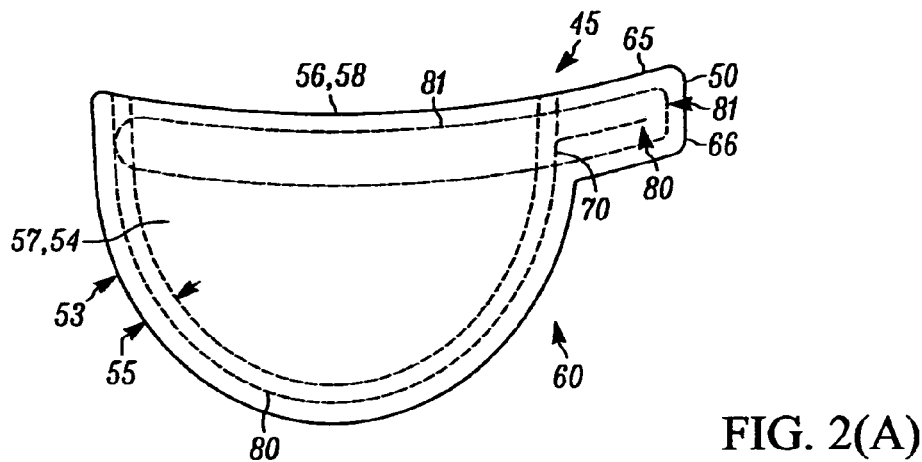
FIGS. 2(A)-2(C) are, respectively, front elevation views of three different exemplary embodiments of new pocket-foods having one or more protrusions, with FIG. 2(C) showing a preferred embodiment.

Referring to FIGS. 1(A)-1(D) (Prior Art), an exemplary pocket-type food (or simply "pocket-food"), in this case a pierogi 5, is shown. As shown in FIG. 1(A), formation of the pierogi 5 typically begins by obtaining a generally circular or elliptical section of dough 10, often by cutting the desired section from a larger sheet of dough 20. The section 10 typically is substantially symmetrical at least about a first axis 30 so that, as discussed further below, the section can be folded generally in half to create a pocket. The sheet 20 typically is relatively thin and can be made from a variety of dough-type substances as are well known to those of ordinary skill in the art. Typically, the dough of the sheet 20 is uncooked (or only partly cooked) so that it is malleable and so that portions of the dough can be pressed together to stick or merge with one another, or can otherwise be affixed to one another.

Referring specifically to FIG. 1(B), a portion of food stuffing material 15 is positioned proximate the middle of the section 10, often more to one side of the middle than to the other. The food stuffing material can be any of a variety of materials, such as cheese(s), ground beef and other meats (e.g. chicken, or even seafood), potatoes, potato-onion mixtures, sauerkraut, mushrooms, vegetables, fruits, and other virtually any other edible materials that can be made to fit generally within the finished pocket-food. Upon placement of the portion of food stuffing material 15, a first half 25 of the section 10 is folded over with respect to a second half 24 around the portion of food stuffing material, and edges 27,26 of the respective halves are attached to one another, typically by applying pressure (e.g., finger pressure or pressure from a machine) along the edges, thus forming a pocket, as shown in FIGS. 1(C)-(D).

The combined edges 26,27 generally form a rim 35 that extends about much of the perimeter of the pierogi 5. However, a backside 36 of the pierogi is not formed by the assembly of the edges 26,27, but rather is formed as the intersection of the two integrally-connected halves 24,25 that were folded with respect to one another. That is, the backside 36 of the pierogi 5 is formed by a folded-over or hinged edge 38 as shown particularly in FIG. 1(D). The rim 35 generally has a small, constant width 37 (e.g., less than a centimeter).

At a time following the formation of the pierogi 5 as a stuffed dough pocket, the pierogi is finally prepared, such that the portion 15 is cooked (if necessary) and such that the dough also is cooked so that it becomes stronger and is no longer so amorphous, malleable and sticky. Typically, this final preparation process involves either boiling/steaming or frying the pierogi, although other methods of cooking such as baking, etc. are also possible.

Although pierogies are shown in FIGS. 1(A)-1(D) as well as throughout the remaining FIGS., the present invention is intended in alternate embodiments to be equally applicable to other pocket-foods such as ravioli, pot-stickers, knedle, piroshki, calzones, empanadas, other types of stuffed dumplings, and similar foods, even though the exact formation of these pocket-foods can differ somewhat from the general description provided above concerning the formation of the pierogies. For example, some such pocket-foods are not formed by folding over a section of dough around the food stuffing material, but rather are formed by affixing a first slab of dough onto a second slab of dough, with the food stuffing material positioned in between the two slabs. Also, in some alternate embodiments, the pocket-foods are formed by injecting the food stuffing material into a portion of dough, which may or may not have a preformed cavity. Although placement of the food stuffing material typically occurs while the dough (or other material having a consistency similar to uncooked dough, e.g., a consistency similar to silly putty) is in a malleable state, in some embodiments the placement of the food stuffing material will occur after the dough is in a more fully-cooked (and less malleable, sticky, and amorphous) state.

Typically, pierogies such as those shown in FIGS. 1(A)-1(D) and discussed below with reference to the remaining FIGS. are moderate in size (e.g., less than 10 centimeters in length) and weight. However, the present invention is intended in alternate embodiments to be equally applicable to other pocket-foods having sizes and shapes different than those of conventional pierogies. For example, in an alternate embodiment, halves of a square section of dough could be folded over one another around the food stuffing material to form a generally triangular pocket-food. Further, for example, the present invention is applicable to other forms of pocket foods (e.g., ravioli) that are typically smaller than pierogi. Preferably, the pocket-foods are designed so that, when the pocket-foods are bitten into (e.g., the pocket is unsealed), residual food stuffing material within the uneaten portion of the pocket does not overly readily fall out of the remainder of the pocket (although this will depend to some extent upon the type of food stuffing materials that are used), and the pocket does not collapse or fall apart too easily. Also, while most pierogies and other pocket-foods, in their fully formed state, are fully-sealed pockets containing food stuffing material therewithin, the present invention also is intended in alternate embodiments to be applicable to pocket-foods that are formed as "partially-open pockets" without fully sealing the food stuffing material therewithin.

Turning to FIG. 2(A), an exemplary embodiment of an improved pierogi 45 is shown to include a section of dough 53 that is folded over and around a portion of food stuffing material 54, a rim 55, a backside 56 with a hinged edge 58, a central portion 57 within which is located the food stuffing material, and additionally, in accordance with one embodiment of the present invention, an extension or protrusion 50 that extends outward from the rim at a first end 60 of the pierogi. Further as shown, an upper edge 65 of the protrusion 50 is generally parallel to (and can be integrally formed as part of) the hinged edge 58 while a lower edge 66 of the protrusion curves back around from the upper edge and eventually meshes with the rim 55. Also as shown, the protrusion 50 is fairly large in its surface area so that it is capable of being easily grabbed and held, typically between a person's thumb and index finger (or other fingers). For example, in one embodiment, the surface area of the protrusion 50 as defined between the upper edge 65, lower edge 66 and rim 55 could be approximately one square centimeter. However, the size and shape of the protrusion 50 could vary depending upon a variety of factors such as, for example, the size and weight of the pierogi 45 itself, the width of the rim 55, and desired appearance and taste.

In embodiments such as that shown in FIG. 2(A), the protrusion 50 is integrally formed with, and forms an extension or protrusion of, the rim 55. That is, the protrusion 50 is made from the same dough as the rim 55, and constitutes an extension of the rim 55 that juts outward beyond a normal rim perimeter 70 that would exist in a conventional pierogi. Like the rim 55, in the present embodiment the protrusion 50 is formed from two layers of dough that have been pressed together (e.g., by a person or machine assembling the pierogi), which respectively correspond to the two halves of the section of dough 53 that have been folded over with respect to one another. In alternate embodiments, the protrusion need not be integrally formed with the rim 55 and, instead, could be attached to the rim and/or to other portion(s) of the pierogi 45 or the section of dough 53 forming the pierogi (e.g., by sandwiching a portion of uncooked dough constituting the protrusion with respect to other portions of uncooked dough of the pierogi and applying pressure thereto). Further, in other embodiments (including that discussed with reference to FIG. 2(C), the rim 55 and/or the protrusion 50 could be made from multiple layers of dough including, for example, layers that were not integrally formed with the rim, or from a single layer of dough.

In the embodiment of FIG. 2(A), the portion of food stuffing material 54 does not extend beyond the central portion 57 into the protrusion 50, but instead is restricted to being within the central portion 57 by the rim 55 in the same manner as it would have been in a conventional pierogi in the absence of the protrusion 50. This is preferable since, by limiting the protrusion 50 to being made from layers of dough, the protrusion will not retain heat to the same degree as the central portion 57 of the pierogi when the pierogi is cooked, and consequently will be more comfortably grasped by a consumer when served. However, in alternate embodiments, a small portion of the food stuffing material could extend into an inner cavity (not shown) within the protrusion 50. Also, in further alternate embodiments, the food stuffing 54 does not extend all of the way to the backside 56 of the pierogi 45. Rather, in such embodiments, the backside also includes a rim (having, for example, approximately the same width as the rim 55) formed by the pressing together of the two layers dough that are integrally connected along the backside, and the food stuffing material only extends up to the rim.

It is desirable that the protrusion 50 be reasonably robust, and further that it be reasonably strongly attached to the remainder of the pierogi 45, so that it is a reasonably reliable device for grasping and holding the pierogi 45. In the embodiment of FIG. 2(A), the strength of the protrusion 50 is enhanced due to the fact that it is formed from two layers of dough that are not only affixed to one another (due to being pressed against one another) but also integrally connected along the upper edge 65. Additionally, the protrusion 50 is strongly attached to the remainder of the pierogi 45 insofar as it is integrally formed with the rim 55. Further, the manner of formation of the protrusion 50 involving dual layers of dough that are affixed to one another and integrally connected at one edge is equally true with respect to the portion of the rim 55 to which the protrusion is connected. Indeed, the integral attachment of the dual layers of the protrusion 50 along the upper edge 65 is essentially a continuous extension of the hinged edge 58 that extends along the backside 56 of the pierogi 45. Due to this configuration, the upper edge 65/hinged edge 58 can bear the significant tension that can occur along those portions of the pierogi 45 when it is picked up by way of the protrusion.

The strength of the protrusion 50, the strength of the connection between the protrusion and the remainder of the pierogi 45, and the strength the pierogi in general, each are enhanced by the final preparation process in which the pierogi 45 is fried, boiled/steamed or otherwise cooked. Although not necessary in all embodiments, in certain embodiments additional pressure is applied to, and/or certain additional specialized cooking processes are performed upon, the protrusion 50 even after the remainder of the pierogi 45 has been finally prepared. For example, after the pierogi 45 has been fully boiled/steamed or fried, additional steps of applying further pressure to the protrusion 50 and further frying the protrusion can be performed. In some such embodiments, the finished pierogi would have a protrusion that was "extra-crunchy" relative to the remainder of the pierogi.

Also, in alternate embodiments, the strength of the protrusion 50, the strength of the connection between the protrusion 50 and the remainder of the pierogi 45, and the strength of the pierogi generally can be enhanced by adding one or more additional dough or edible inserts within the protrusion and/or the remainder of the pierogi, or by adding one or more additional straps of dough linking the protrusion with the remainder of the pierogi. FIG. 2(A) shows exemplary features in this regard by way of a dashed line 80, which represents an edible insert (such as an additional hardened piece of dough or even a pretzel) that is embedded within the rim 55 and the protrusion 50 during formation of the pierogi 45, and dashed line 81, which shows an extra layer of dough that forms a strap linking the protrusion 50 with the remainder of the pierogi. The one or more strap(s) 81 could be attached along the pierogi's exterior, and/or within its interior. While less desirable, inedible inserts could also be used in certain embodiments (which would require that a person eating the pierogi "eat around" the inserts).

Figure 2B:
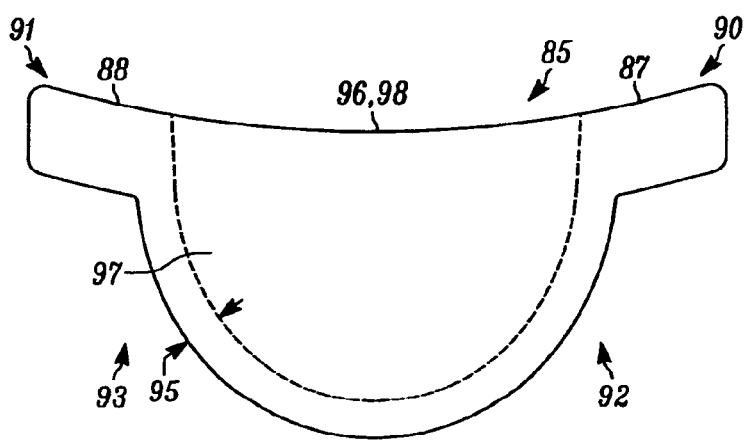

Referring to FIG. 2(B), a second exemplary embodiment of an improved pierogi 85 is shown to have a rim 95, a backside 96 with a hinged edge 98, a central portion 97 and, in addition, first and second protrusions 90, 91 at first and second ends 92, 93 of the pierogi, respectively. As in the case of the pierogi 45 of FIG. 2(A), the protrusions 90,91 include respective upper edges 87,88 that constitute extensions of the hinged edge 98. Each of the protrusions 90, 91 can, as shown, be identical to (mirror images of) one another in terms of their shapes, sizes and other (including functional) characteristics. However, in alternate embodiments, the protrusions 90, 91 can differ from one another. Indeed, as shown from a comparison of FIGS. 2(A) and 2(B), the protrusions 90,91 differ in size and shape from the protrusion 50. FIG. 2(B) should be indicative of the fact that a plurality of protrusions can be provided on any given pierogi. Indeed, the present invention is intended in its limit to encompass embodiments in which the entire rim of the pierogi (e.g., the rims 55 or 95) is increased in width such that the pierogi can be easily grasped at a variety of angles; however, such embodiments are not preferred, since the added dough of such a large rim is likely to be culinarily excessive.

Figure 2C:
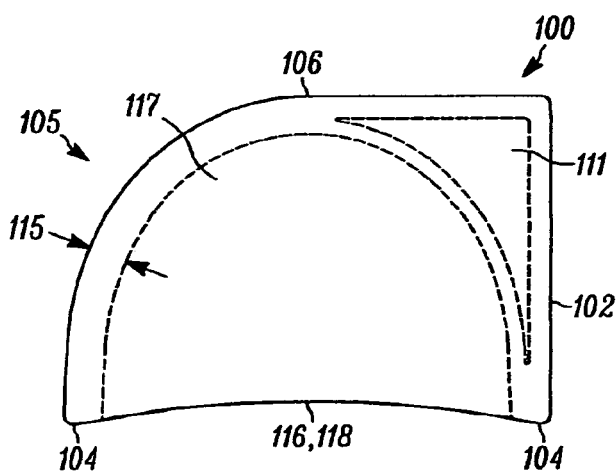

Referring to FIG. 2(C), a third, exemplary and preferred embodiment of an improved pierogi 105 is shown to have, in common with the pierogies 45,85, a rim 115, a backside 116 with a hinged edge 118, and a central portion 117. In contrast to the pierogies 45,85 of FIGS. 2(A) and 2(B), however, the pierogi 105 has a protrusion 100 that is formed at least in part by an extended portion 102 of the rim 115 that extends outward away from an approximately 90-degree segment around the rim (e.g., from one of a pair of ends 104 of the hinged edge 118 to at or near a midpoint 106 of the rim). In the embodiment shown, the extended portion 102 is largely triangular in shape although, in alternate embodiments, the extended portion could take on other (e.g., rounded) shapes. Insofar as it constitutes an extension of the rim 115, the extended portion 102 preferably (although not necessarily) comprises at least two layers of dough that are pressed together. Also, because the extended portion 102 in the present embodiment is attached to the pierogi along an entire (or most of a) 90-degree segment around the rim 115 of the pierogi, the extended portion 102 provides a grasping surface that offers considerable support for the entire pierogi.

In the particular embodiment shown in FIG. 2(C), the extended portion 102 is shown to be reinforced by two additional substantially-triangular slabs of dough 111 (shown in phantom) that are attached to one another in between the two layers forming the extended portion 102. In the embodiment shown, therefore, the protrusion 100 of the pierogi 105 in the present embodiment has 4 layers of dough, all of which can be pressed together or otherwise combined so as to form a particularly strong protrusion. Also as shown, in the preferred embodiment, the slabs of dough 111 have substantially the same shape as the extended portions 102 and can be left-over portions of dough that have been severed from the other 90-degree segment around the rim as discussed in further detail with reference to FIG. 3(C). Although the embodiment of FIG. 2(C) is shown to include the 4 layers of dough forming the protrusion 100, in alternate embodiments, a lesser (or even greater) number of layers forming the protrusion can be employed. The selected number of layers will depend, in part, based upon culinary concerns relating to the amount of dough that is included. Also, in alternate embodiments, the slabs 111 or similar slabs can be positioned onto one or both of the outer sides of the extended portion 102 rather than (or in addition to) being positioned in between those outer sides. Further, in alternate embodiments, the slabs 111 could be positioned in between the layers of the extended portion 102 while additional pieces of dough, such as the straps 81 discussed with reference to FIG. 2(A), are attached to the exterior of the pierogi 105.

Figure 3A:
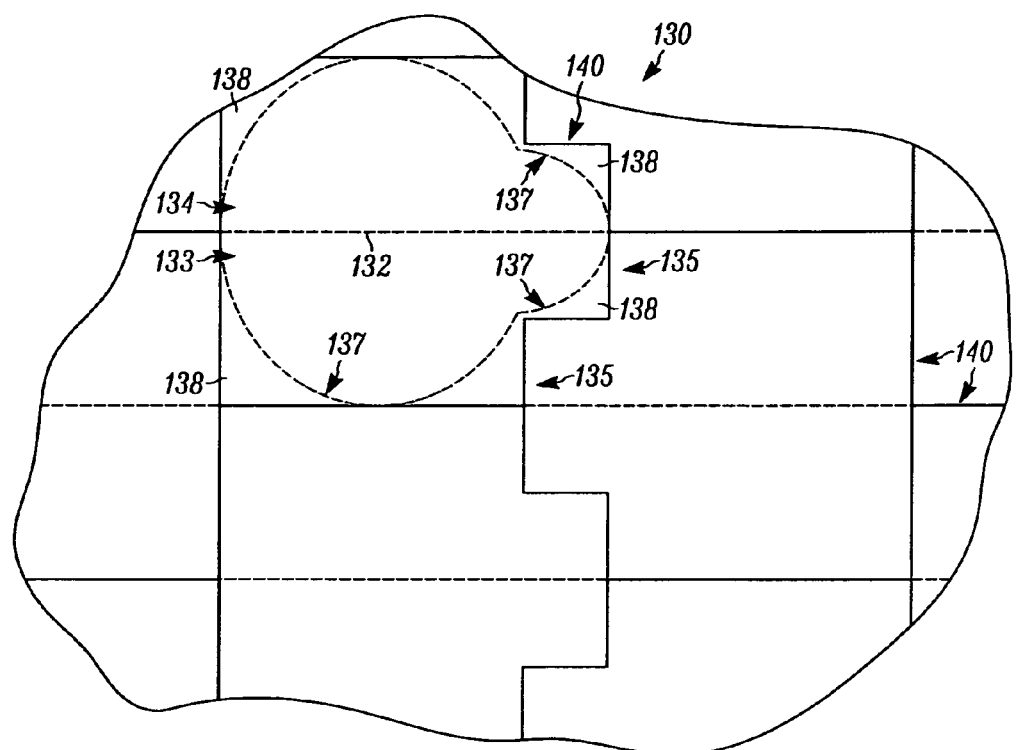
FIG. 3(A)-3(C) are, respectively, front cut-away elevation views of exemplary sheets of dough from which sections used to create the exemplary new pocket-foods of FIG. 2(A)-2(C), respectively, are cut.
Figure 3C:
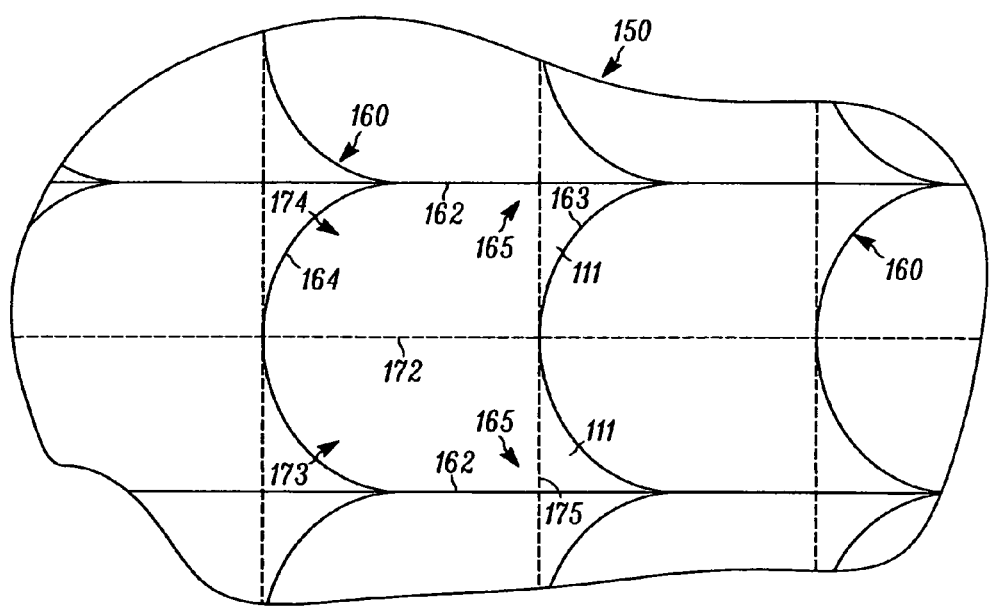
Figure 3B:
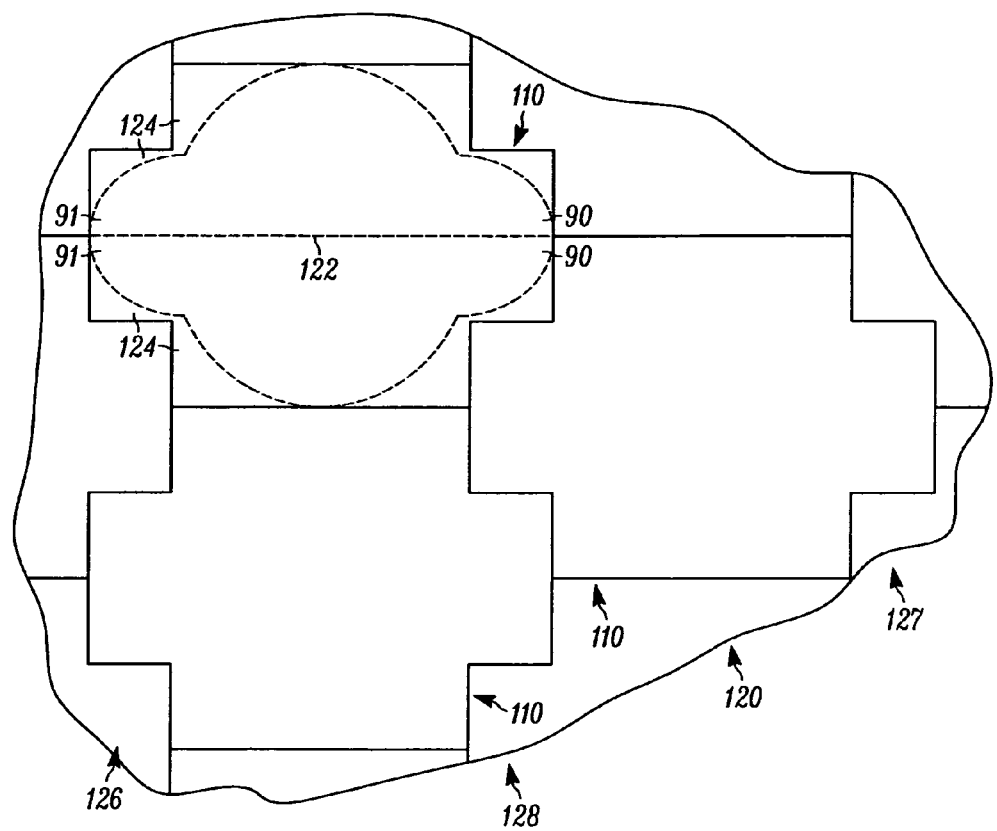

Turning to FIG. 3(B), an exemplary sheet of dough 120 is shown from which a plurality of pierogies of the type shown in FIG. 2(B) (e.g., the pierogi 85) having the first and second protrusions 90,91 can be formed. In particular, as shown, the sheet of dough 120 can be cut into a plurality of sections 110, each of which can be used to form one of the pierogies 85 having the protrusions 90,91 by folding the respective section 110 generally along a respective midline 122 that forms the respective hinged edge 98 of the pierogi. As shown, by appropriately forming a parquet arrangement of the different sections 110, little or no dough (depending upon the exact shape of the protrusions 90,91 and rims 115) need be wasted in creating the sections for forming the pierogies 85 so that the pierogies include the protrusions 90,91 as integral portions of the pierogies. In the embodiment shown, only small corner portions 124 of the dough are wasted.

Referring to FIGS. 3(A) and 3(C), additional sheets of dough 130,150 are shown from which pluralities of pierogies of the respective types shown in FIGS. 2(A) (e.g., the pierogi 45) and 2(C) (e.g., the pierogi 105) can be formed. In particular, with reference to FIG. 3(A), the sections 130 are formed in an appropriate parquet arrangement such that each of the sections includes a respective outlying portion 135 that can form the protrusion 50 of the respective pierogi 45. When the pierogies 45 are formed, two respective complementary halves 133,134 of each of the sections 130 are folded towards one another (or at least one towards the other) along a respective midline 132 of the section. As shown by dashed lines 137 defining the outline of the protrusion 50 and rim 55 of one of the pierogies 45 about to be formed, only small corner portions 138 of the dough are wasted (e.g., cut away) to form the characteristic shape of the finished pierogies 45, although in alternate embodiments different amounts of the dough are (or potentially even none of the dough is) cut away and/or wasted.

With reference to FIG. 3(C), the sheet of dough 150 is shown to include sections 160 that can be used to form pierogies in accordance with the preferred embodiment of pierogi 105 shown in FIG. 2(C). The sections 160 have outlines that generally include two parallel lines 162, two ends of which are coupled by way of a concave edge 163 and two opposite ends of which are coupled by a convex edge 164 having generally the same radius of curvature as the concave edge 163. When one of the pierogies 105 is formed from one of the sections 160, two slabs 111 for the pierogi 105 are formed by severing the slabs from two complementary halves 173,174 of the respective section along a severing line shown as a dashed line 175. The slabs 111 are then placed onto respective inner corner portions 165 of the complementary halves 173, 174. Finally, the complementary halves 173,174 are folded towards one another (or at least one towards the other) along a respective midline 172 of the section, with the slabs 111 being between the inner corner portions 165, which form the extended portion 102 of the rim 115 as discussed with reference to FIG. 2(C). As shown, the shape of the sections 160 is such that the sheet of dough 150 can be formed in a parquet arrangement having multiple sections 160, by which multiple pierogies 105 can be formed without wasting any (or without wasting much) of the dough. In alternate embodiments, the slabs 111 need not be severed from the complementary halves 173,174 but instead can be folded onto and remain integral with the inner corner portions 165 along the severing line 175.

Figure 4:
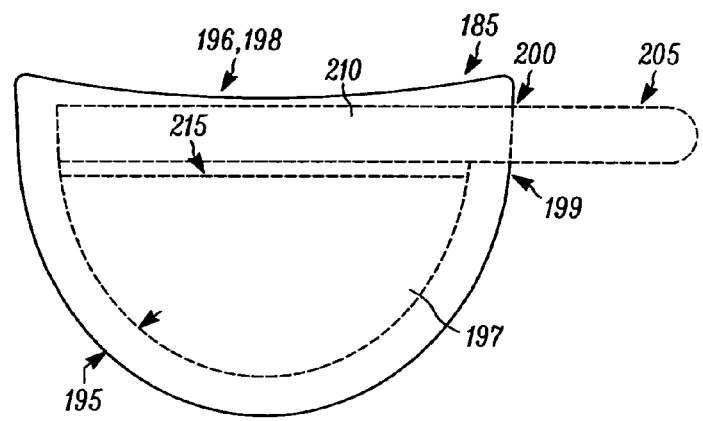
FIG. 4 is a front elevation view of an additional exemplary embodiment of a new pocket-food having a protrusion.

Referring to FIG. 4, a fourth embodiment of an improved pierogi 185 is shown to have a rim 195, a backside 196 with a hinged edge 198, a central portion 197 and, in addition, a rod-type support 200 that extends from within the pierogi along (or proximate to) the hinged edge outward past a side 199 of the pierogi. An extended end 205 of the rod-type support 200 serves as a mechanism for grasping or supporting the remainder of the pierogi 185. Though not integrally formed as a part of the dough of the pierogi 185, the rod-type support 200 can be substantially affixed to the remainder of the pierogi by embedding an inner portion 210 of the rod-type support within the dough, for example, by embedding the inner portion within the dough forming the hinged edge 198 or by wedging the inner portion between the hinged edge 198 and an additional region 215 along which the two complementary halves of the section of dough forming the outside of the pierogi are pressed together in the same manner as those halves are pressed together to form the rim 195.

Regardless of the manner in which the rod-type support 200 is affixed with respect to the remainder of the pierogi 185, the rod-type support 200 is preferably (though not necessarily) made from an edible material such as a pretzel or additional dough. In alternate embodiments, the rod-type support 200 is a stick made from an inedible material such as wood (e.g., a popsicle stick); however, such embodiments are not preferred since such a support is likely to be obtrusive and in any case inedible. Although the rod-type support 200 in the embodiment of FIG. 4 only extends out of one side 199 of the pierogi 185, in alternate embodiments it can extend out of both sides of the pierogi. Also, in further alternate embodiments, the rod-type support 200 can be positioned at other locations within the pierogi 185 rather than along the edge 198.

Figure 6:
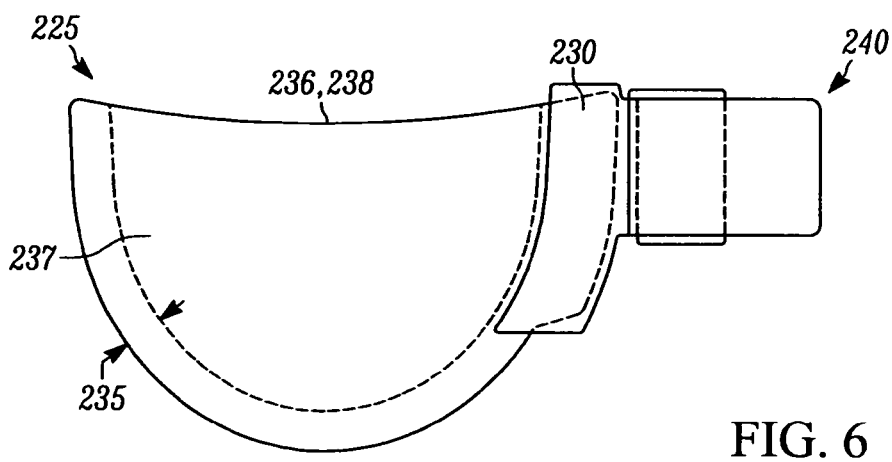
FIG. 6 respectively shows an additional exemplary embodiment of a new pocket-food having an extension formed by the clip of FIGS. 5(A)-5(B).

Referring to FIG. 6, a fifth embodiment of an improved pierogi 225 is shown to have a rim 235, a backside 236 with a hinged edge 238, a central portion 237 and, in addition, an extended portion 230 of the rim that extends outward from the remainder of the rim. In the embodiment shown, the extended portion 230 extends outward from the remainder of the rim 235 proximate the backside 236 and hinged edge 238 (similar in terms of location to that of the protrusion 50 of FIG. 2(A)), although in alternate embodiments one or more of such extended portions can exist at other position(s) along the rim (or even along the hinged edge 238). In certain embodiments, the entire rim 235 is of larger width. All of these embodiments, however, are such that the extended portion (or portions) 230 is sufficiently wide as to be graspable by a clip 240. The clip, which in turn is graspable by a person's fingers, allows the person to more easily pick up the improved pierogi 225 than it would be to pick up a conventional pierogi with a conventional rim such as the pierogi 5 with the rim 35 shown in FIGS. 1(A)-1(C). Although the extended portion 230 of the pierogi 225 can be as wide (e.g., in terms of the distance which the portion extends outward beyond a normal extent of the rim 235) as the protrusions 50,90,91 or 100 discussed above with respect to FIGS. 2(A)-2(C), it need not be quite as wide; rather, as shown in FIG. 6, the extended portion need only be sufficiently wide as to facilitate the grasping of the extended portion by the clip 240.

Figure 5A:
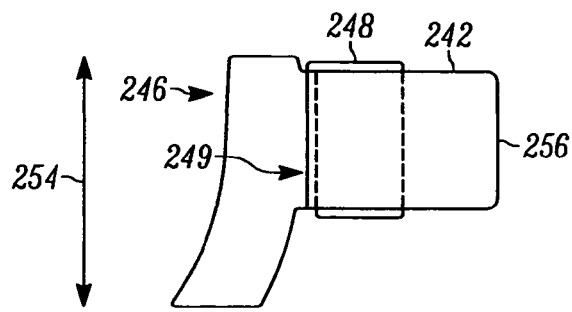
FIGS. 5(A)-5(B) respectively show a side elevation view and a top elevation view of a clip that can be employed as an extension in another exemplary embodiment of a new pocket-food.
Figure 5B:
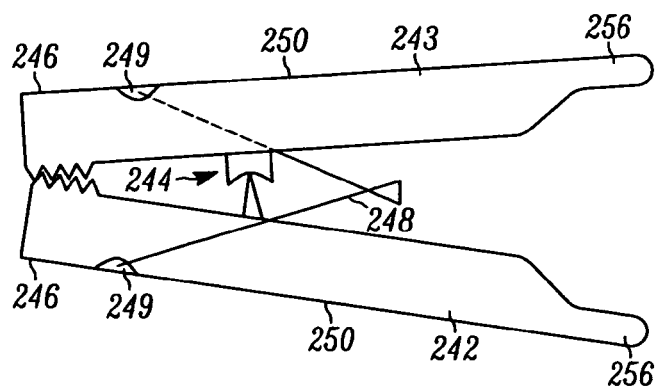

Referring additionally to FIGS. 5(A)-5(B), an exemplary embodiment of the clip 240 is shown to be similar to that of a "chip clip" used to reseal opened bags of potato chips or the like. As shown, the clip 240 includes first and second lever arms 242,243 (see in particular FIG. 5(B)) that are rotatable or pivotable about one another by way of a fulcrum 244 formed between the two arms. The clip 240 is normally forced into a closed or grasping position in which toothed ends 246 of the two arms 242,243 are in contact with one another. The clip 240 is forced into this closed position by way of a spring 248, two ends of which fit into grooves 249 along outside edges 250 of the two arms 242,243 generally located between the fulcrum 244 and the toothed ends 246. The clip 240 also can be forced into an opened position when pressure is placed upon opposite manually-actuatable ends 256 on the opposite sides of the arms 242,243 away from the toothed ends 246. Thus, a person can cause the clip 240 to open by applying pressure to the manually-actuatable ends 256 and affix the clip 240 onto an extended portion 230 of the pierogi 225. When the person has finished eating the vast majority of the pierogi (or at such other time as the clip 240 should be disengaged from the pierogi 225), the person can release the clip 240 by again applying pressure to the ends 256. As shown particularly in FIGS. 5(A) and 5(C), in a preferred embodiment, the toothed ends 246 have a linear dimension 254 that is comparable in length to the exemplary extended portion 230 to which the clip 240 is attachable. Although the clip 240 in one embodiment takes the form shown in FIGS. 5(A)-5(C), the clip in alternate embodiments can take a variety of forms, many of which are known to be used in other contexts (e.g., a form of a "binder clip", etc.).

While the foregoing specification illustrates and describes the preferred embodiments of this invention, it is to be understood that the invention is not limited to the precise construction herein disclosed. The invention can be embodied in other specific forms without departing from the spirit or essential attributes of the invention. In particular, the present invention is intended to encompass all forms of pocket-foods in which, in order to render the foods more easily graspable and supportable by a person's fingers and thus more easily eatable as finger-food, the foods include one or more protrusions such as those discussed above or similar mechanisms (and/or other mechanisms for reinforcing and strengthening the structure of the pocket-food such as those discussed above, for example, the insert 80, the straps 81, the slabs 111 and similar mechanisms). Accordingly, reference should be made to the following claims, rather than to the foregoing specification, as indicating the scope of the invention.

What is claimed is:
1. A product that is at least partly consumable comprising:
a pocket formed from dough, wherein the pocket has a length dimension, a width dimension and a depth dimension, wherein each of the width dimension and the length dimension is substantially greater in extent than the depth dimension, and wherein a perimeter that extends around the pocket substantially encompasses the length dimension and the width dimension;
a portion of a food stuffing material captured within the pocket; and
a protrusion coupled to the pocket along at least most of a 90 degree segment around the perimeter, wherein the protrusion is capable of being grasped and, when so grasped, the pocket is capable of being supported by the protrusion, and wherein the pocket is formed as one of a plurality of pockets formed from a sheet of the dough divided into a plurality of dough sections, with a first of the dough sections being used to form the one pocket and having a curved edge forming a portion of the perimeter of the pocket.

2. The product of claim 1, wherein the protrusion is sufficiently large so that it can be grasped by way of a thumb and an index finger.

3. The product of claim 1, wherein the protrusion includes a first side surface and a second side surface substantially opposite the first side, wherein none of the portion of the food stuffing material is positioned in between the first and second side surfaces of the protrusion, and wherein each of the first and side surfaces has a surface area of at least one square centimeter.

4. The product of claim 1, wherein the perimeter of the pocket includes an approximately 90 degree curved section, and wherein the protrusion is coupled along substantially all of the curved section, and wherein the length dimension is substantially greater in extent that the width dimension.

5. The product of claim 1, wherein the protrusion includes dough that is integrally formed as part of the dough forming the pocket.

6. The product of claim 5, wherein the protrusion includes two layers of the dough that are pressed together to form a double-layer extension.

7. The product of claim 6, wherein formation of the protrusion includes an additional step of cooking to further enhance the strength of the protrusion.

8. The product of claim 6, wherein the protrusion includes four layers of the dough that are pressed together to form a quadruple-layer extension.

9. The product of claim 1, further comprising a second protrusion also coupled to the pocket.

10. The product of claim 1, wherein the protrusion is an extension of at least a portion of a rim about at least a portion of the perimeter of the pocket, and wherein the protrusion is configured for being grasped by a clip.

11. The product of claim 10, further comprising a clip that grasps the protrusion, wherein the clip further includes a portion that is capable of being grasped by a thumb and an index forger, and wherein the clip effectively forms a portion of the protrusion.

12. The product of claim 1, further comprising a support beam that extends from within an interior of the pocket out beyond a rim of the pocket, and wherein the protrusion includes an outer portion of the support beam extending beyond the interior of the pocket, wherein the support beam is one of a solidified piece of dough and a pretzel.

13. The product of claim 1, wherein the pocket is generally of the form of a pierogi.

14. The product of claim 1, wherein the pocket is generally of the form of a ravioli.

15. A product that is at least partly consumable comprising:
a pocket formed from dough, wherein the pocket has a length dimension, a width dimension and a depth dimension, wherein each of the width dimension and the length dimension is substantially greater in extent than the depth dimension, and wherein a perimeter that extends around the pocket substantially encompasses the length dimension and the width dimension;
a portion of a food stuffing material captured within the pocket; and
a protrusion coupled to the pocket along at least most of a 90 degree segment around the perimeter, wherein the protrusion is capable of being grasped and, when so grasped, the pocket is capable of being supported by the protrusion, and
wherein the protrusion includes dough that is integrally formed as part of the dough forming the pocket.

16. A method of manufacturing the product of claims 15, the method comprising:
providing the sheet of the dough;
cutting out a plurality of the sections of the dough;
applying a portion of secondary food material adjacent to at least one of the sections of the dough, wherein the secondary food material includes the food stuffing material; and
securing the portion of secondary food material within the at least one section of the dough so that the secondary food material is captured within the at least one section of the dough.

17. The method of claim 16, further comprising:
forming the protrusion from at least one of:
a portion of the at least one section of the dough while the at least one section of the dough is cut, wherein the protrusion is solidified by way of at least one of frying the protrusion, applying pressure to the protrusion, boiling the protrusion, steaming the protrusion; and
a portion of tertiary food material in contact with the at least one section of the dough.

18. A method of manufacturing the product of claims 15, the method comprising:
providing a sheet of the dough;
cutting out a plurality of sections of the dough;
applying a portion of secondary food material adjacent to at least one of the sections of the dough, wherein the secondary food material includes the food stuffing material; and
securing the portion of secondary food material within the at least one section of the dough so that the secondary food material is captured within the at least one section of the dough.

19. A product that is at least partly consumable comprising:
a pocket formed from dough, wherein the pocket has a length dimension, A width dimension and a depth dimension, wherein each of the width dimension and the length dimension is substantially greater in extent than the depth dimension, and wherein a perimeter that extends around the pocket substantially encompasses the length dimension and the width dimension;
a portion of a food sniffing material captured within the pocket; and
a protrusion coupled to the pocket along at least most of a 90 degree segment around the perimeter, wherein the protrusion is capable of being grasped and, when so grasped, the pocket is capable of being supported by the protrusion,
wherein the protrusion is sufficiently large so that it can be grasped by way of a thumb and an index finger.

20. A method of manufacturing the product of claims 19, the method comprising:
providing a sheet of the dough;
cutting out a plurality of sections of the dough;
applying a portion of secondary food material adjacent to at least one of the sections of the dough, wherein the secondary food material includes the food stuffing material; and
securing the portion of secondary food material within the at least one section of the dough so that the secondary food material is captured within the at least one section of the dough.

* * * * *